US006731678B1

(12) United States Patent
White et al.

(10) Patent No.: US 6,731,678 B1
(45) Date of Patent: May 4, 2004

(54) SYSTEM AND METHOD FOR EXTENDING THE OPERATING RANGE AND/OR INCREASING THE BANDWIDTH OF A COMMUNICATION LINK

(75) Inventors: Albert L. White, Olathe, KS (US); Martin J. Kaplan, Olathe, KS (US)

(73) Assignee: Sprint Communications Company, L.P., Overland Park, KS (US)

(*) Notice: Subject to any disclaimer, the term of this patent is extended or adjusted under 35 U.S.C. 154(b) by 0 days.

(21) Appl. No.: 09/699,919

(22) Filed: Oct. 30, 2000

(51) Int. Cl.[7] .................................................. H04L 5/14
(52) U.S. Cl. ....................... 375/219; 375/222; 375/260; 379/93.07
(58) Field of Search ................................ 375/219, 220, 375/222, 260, 225, 295, 316; 379/93.01, 93.07, 93.08, 93.09, 93.11, 100.12; 370/320, 334, 335, 342, 441, 480, 485, 490; 455/132, 135, 275, 279.1

(56) References Cited

U.S. PATENT DOCUMENTS

| 5,265,151 A | * | 11/1993 | Goldstein ................. 379/93.32 |
| 5,280,472 A | * | 1/1994 | Gilhousen et al. .......... 342/375 |
| 5,598,413 A | * | 1/1997 | Sansom et al. ............. 370/468 |
| 5,608,733 A | * | 3/1997 | Vallee et al. ................ 370/394 |

(List continued on next page.)

OTHER PUBLICATIONS

American National Standards Institute (ANSI), Network and Customer Installation Interfaces—Asymmetric Digital Subscriber Line (ADSL) Metallic Interface, Nov. 11, 1998, 264 pages, published by ANSI, 11 West 42nd Street, New York, New York 10036.

The ATM Forum Technical Committee, Inverse Multiplexing for ATM (IMA) Specification Version 1.1, Mar., 1999, 185 pages, published by The ATM Forum Worldwide Headquarters, 2570 West El Camino Real, Suite 304, Mountain View, CA 94040–1313.

Dr. Walter Y. Chen, DSL Simulation Techniques and Standards Development for Digital Subscriber Line Systems, ISBN 1–57870–017–5, 1998, Chapter 5 pp. 75–90, Chapter 13 pp. 427–460, published by Macmillan Technical Publishing.

Clyde F. Coombs, Jr., Communications Network Test & Measurement Handbook, ISBN 0–07–012617–8, 1998, pp. 420–437, pp. 469–476, published by The McGraw-Hill Companies, Inc.

Primary Examiner—Khai Tran
Assistant Examiner—Khanh Cong Tran

(57) ABSTRACT

A system and method for extending the operating range and/or increasing the bandwidth of a communication link. The communication link may consist of any two communication devices that are connected by two or more separate "band limited" communication paths for the transmission of information therebetween. In operation, the communication devices use a "frequency split scheme" to divide the information transmitted between the devices into two or more signals, each of which is transmitted over one of the communication paths. A "frequency foldback scheme" may also be used to shift the information from the higher frequencies to the lower frequencies of each respective signal, thereby taking advantage of the fact that more information can be carried in the lower frequencies. By using these schemes, it is possible to extend the operating range of the communication link and/or transmit a greater amount of information over the communication paths to thereby increase the bandwidth of the communication link.

32 Claims, 10 Drawing Sheets

U.S. PATENT DOCUMENTS

| | | | |
|---|---|---|---|
| 5,742,527 A | | 4/1998 | Rybicki et al. |
| 5,751,701 A | | 5/1998 | Langberg et al. |
| 5,781,728 A | | 7/1998 | Rybicki et al. |
| 5,901,205 A | * | 5/1999 | Smith et al. ............. 379/93.01 |
| 5,930,340 A | | 7/1999 | Bell |
| 5,940,403 A | * | 8/1999 | Williams .................... 370/465 |
| 6,002,670 A | * | 12/1999 | Rahman et al. ............. 370/238 |
| 6,005,876 A | * | 12/1999 | Cimini et al. ............... 370/525 |
| 6,069,922 A | * | 5/2000 | Dyke ........................ 370/204 |
| 6,084,917 A | * | 7/2000 | Kao et al. ................... 375/219 |
| 6,134,246 A | * | 10/2000 | Cai et al. .................... 370/474 |
| 6,148,010 A | * | 11/2000 | Sutton et al. ............... 370/536 |
| 6,167,034 A | | 12/2000 | Langberg et al. |
| 6,167,099 A | * | 12/2000 | Rader et al. ................ 375/347 |
| 6,198,749 B1 | * | 3/2001 | Hui et al. ................... 370/463 |
| 6,246,695 B1 | * | 6/2001 | Seazholtz et al. ........... 370/468 |
| 6,252,548 B1 | * | 6/2001 | Jeon .......................... 342/383 |
| 6,487,222 B1 | * | 11/2002 | Williams .................... 370/536 |

* cited by examiner

FIG. — 1
(PRIOR ART)

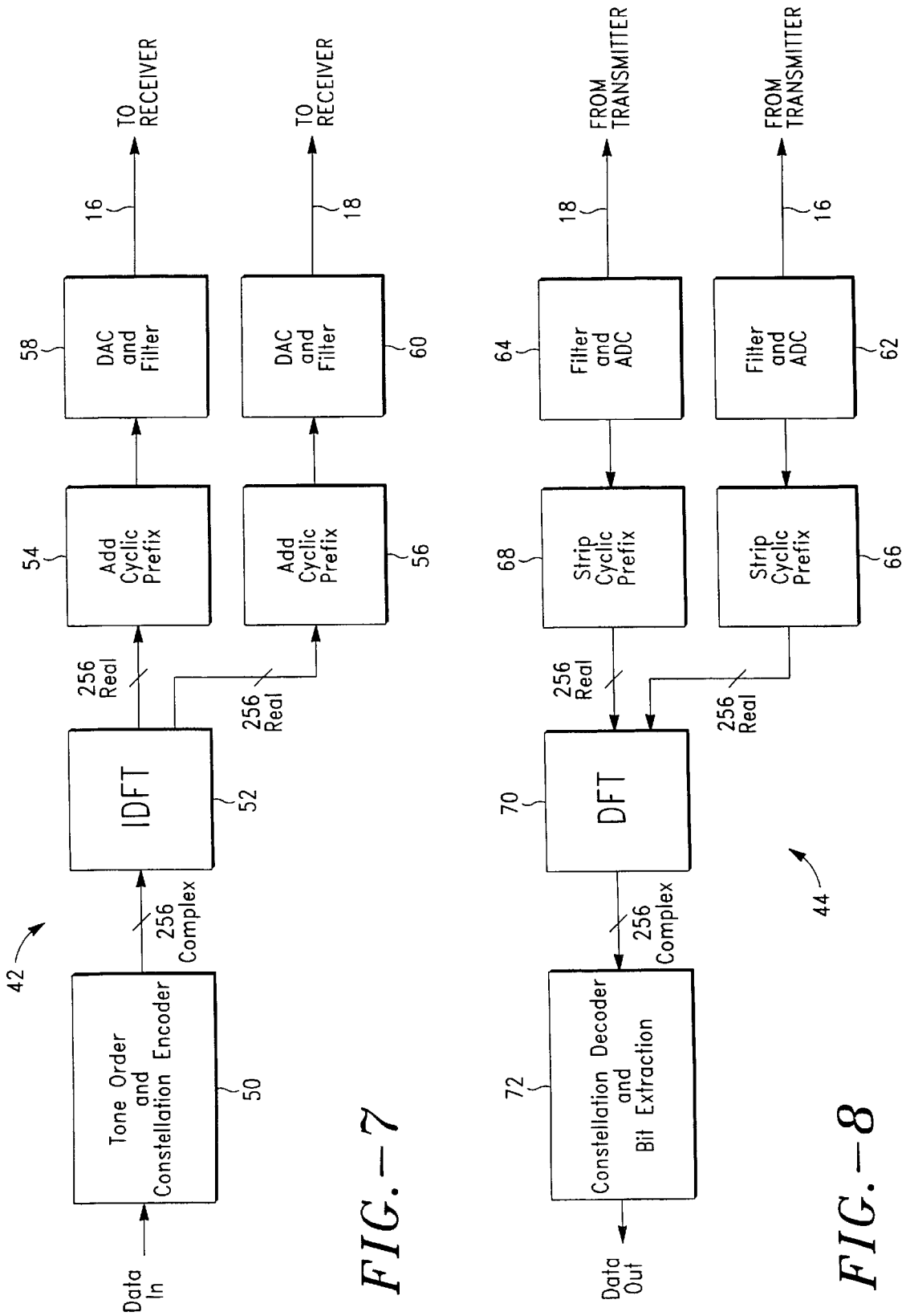

SYSTEM AND METHOD FOR EXTENDING THE OPERATING RANGE AND/OR INCREASING THE BANDWIDTH OF A COMMUNICATION LINK

BACKGROUND OF THE INVENTION

1. Field of the Invention

The present invention is directed to a system and method for extending the operating range and/or increasing the bandwidth of a communication link. The invention is applicable to the transmission of information over any type of "band limited" media, including metallic twisted wire pairs, coaxial cables, fiber optic cables, and radio frequency ("RF") paths.

2. Description of Related Art

Over the last several years, the demand for high-speed data communication services has exploded. Most homes and small businesses, for example, have at least one personal computer ("PC") with a dial-in modem that can be used to connect with an Internet service provider ("ISP") via the public switched telephone network ("PSTN"). These dial-in modems generally operate at 14.4 kb/s, 28.8 kb/s, 33.6 kb/s, or even 56 kb/s. As such, dial-in Internet connections are capable of providing basic Internet services, including Web access, electronic mail, home banking, electronic commerce and the like.

There are a number of problems, however, associated with the provision of basic Internet services via the PSTN. For example, dial-in modems cannot be used to provide high-speed Internet or other broadband services that require a communication link of 1–2 Mb/s or greater, such as broadcast video, movies-on-demand, distance learning and the like. Also, because Internet data packets are transmitted between the dial-in modems and the ISPs through a voice switch located at the telephone company central office, a significant number of Internet connections (which typically have long holding times) can cause blockage to occur in the switch. Under extreme conditions, essential calls (e.g. 911 calls) may experience dial tone delays. In addition, high volumes of Internet traffic can overload the trunking network that connects the voice switch to the ISPs.

In an effort to overcome the problems associated with dial-in Internet connections, various x-type digital subscriber line ("xDSL") technologies have been developed, the most prevalent of which is asymmetric digital subscriber line ("ADSL") technology. Referring to FIG. 1, a typical ADSL system includes a plurality of remote ADSL transceiver units ("ATU-R") a located at various homes and businesses, and a plurality of complimentary central office ADSL transceiver units ("ATU-C") b located at the telephone company central office. Each ATU-R a communicates with each ATU-C b over a single twisted wire pair c. ATU-R a and ATU-C b can typically support data rates of up to 640 kb/s upstream (i.e. from ATU-R a to ATU-C b) and up to 6 Mb/s downstream (i.e. from ATU-C b to ATU-R a), hence the term "asymmetric."

At each of the various homes and businesses, ATU-R a can be linked to a PC d for the provision of high-speed Internet services, to a TV set top box e for the provision of video services (e.g. movies-on-demand), and/or to any other type of broadband device. In addition, most ADSL systems support plain old telephone service ("POTS"). In those systems, a POTS splitter f is provided to filter out the 4 kHz analog voice signal and route it to an existing analog telephone g. Alternatively, POTS splitter f may be integrated within ATU-R a.

At the telephone company central office, each ATU-C b is connected to a digital subscriber line access module ("DSLAM") h. DSLAM h concentrates and/or switches the various data signals and routes them to their appropriate destination, such as an ATM switch i, an IP router j, or other broadband devices k. All of these devices are in turn connected to a broadband network, thereby relieving the congestion problems associated with the transmission of data signals over the PSTN. If the ADSL system supports POTS, a POTS splitter l is provided to filter out the 4 kHz analog voice signal and route it to a voice switch m of the PSTN. Alternatively, POTS splitter l may be integrated within ATU-C b.

Although various line coding techniques may be used for the transmission of information between ATU-R a and ATU-C b, the most common is discrete multi-tone ("DMT") line coding as adopted by the ANSI T1.413 (1995) standard.

As shown in FIG. 2, DMT line coding is used to divide the information transmitted over twisted wire pair c between 256 subcarriers, each of which occupies 4.3125 kHz for a total bandwidth of 1.104 MHz. While most of the subcarriers are used to carry voice and data signals, some are used for network management and performance measurement functions (e.g. subcarrier #64 at 276 kHz is reserved for a downstream pilot signal) and others are not used at all (e.g. those subcarriers affected by a bridged tap, radio-frequency noise, or impulse noise).

As shown in FIG. 3, the 1.104 MHz frequency spectrum is divided into four frequency bands—a voice band, a guard band, an upstream band, and a downstream band. The voice band, which occupies the lower portion of the frequency spectrum between 0 Hz and 4.3125 kHz (i.e. subcarrier #1), is used to carry a 4 kHz analog voice signal. The guard band, which occupies the next portion of the frequency spectrum between 4.3125 kHz and 25.875 kHz (i.e. subcarrier #'s 2–6), is used to separate the voice band from the upstream and downstream bands. The upstream band, which occupies the next portion of the frequency spectrum between 25.875 kHz and 138 kHz (i.e. subcarrier #'s 7–32), is used to carry data signals from ATU-R a to ATU-C b. The downstream band, which occupies the upper portion of the frequency spectrum between 25.875 kHz and 1.104 MHz (i.e. subcarrier #'s 7–256), is used to carry data signals from ATU-C b to ATU-R a. Thus, with DMT line coding, ATU-R a and ATU-C b are capable of providing both POTS and high-speed Internet and other broadband services over the same twisted wire pair c.

While ADSL technology overcomes the problems associated with dial-in Internet connections, it has its own set of attendant problems. For example, current FCC regulations (i.e. FCC Part 68) limit the maximum power that can be applied to twisted wire pair c so as to control the transmission of small broadcast signals that can interfere with surrounding signals. Because of these power constraints, the distance between ATU-C b and ATU-R a is limited due to the attenuation of the signal at the far end and resulting crosstalk from other twisted wire pairs. This distance will vary according to the data rate being offered, the gauge and generation of twisted wire pair c, the number of bridged taps and other factors. As a result, homes and businesses that are located more than a certain distance from the telephone company central office are not able to receive high speed Internet and other broadband services.

One attempt to solve this problem has been to regenerate the attenuated signal by strategically placing a mid-span DSL repeater on twisted wire pair c between ATU-R a and ATU-C b. Although the cost of the DSL repeater itself is relatively small, the cost of the environmentally-hardened case surrounding the repeater and the labor required to splice the repeater into the twisted wire pair can be prohibitive. In addition to cost issues, there are other problems with powering the DSL repeater and with simply finding a mid-span location to mount the DSL repeater.

Another problem associated with ADSL technology is that ATU-R a and ATU-C b can only support data rates of up to 6 Mb/s downstream, even at the shortest distances. As such, ATU-R a and ATU-C b cannot be used to provide very high speed Internet or other broadband services that require a communication link of 6 Mb/s or greater, such as high definition television ("HDTV"), high-performance business applications and the like.

Thus, while dial-in Internet connections and ADSL technology have satisfied some of the demand for high speed data communication services, a need remains for a system that is capable of transmitting high speed Internet and other broadband services to homes and businesses that are located at greater distances from the telephone company central office. There is also a need for a system that is capable of providing very high speed Internet and other broadband services that require a communication link of 6 Mb/s or greater over the existing twisted wire pair infrastructure.

SUMMARY OF THE INVENTION

The present invention is directed to a system and method for extending the operating range and/or increasing the bandwidth of a communication link. In broad terms, the communication link may consist of any two communication devices that are connected by two or more separate "band limited" communication paths for the transmission of information therebetween. In operation, the communication devices use a "frequency split scheme" to divide the information transmitted between the devices into two or more signals, each of which is transmitted over one of the communication paths. A "frequency foldback scheme" may also be used to shift the information from the higher frequencies to the lower frequencies of each respective signal, thereby taking advantage of the fact that more information can be carried in the lower frequencies. By using these schemes, it is possible to extend the operating range of the communication link and/or transmit a greater amount of information over the communication paths to thereby increase the bandwidth of the communication link.

In a preferred embodiment of the present invention, the communication link comprises an ADSL system in which a remote ADSL transceiver unit ("ATU-R") communicates with a central office ADSL transceiver unit ("ATU-C") over two or more twisted wire pairs. In this embodiment, the ATU-R and ATU-C are designed to use the "frequency split scheme" and "frequency foldback scheme" for the purpose of extending the operating range of the ADSL system, while at the same time transmitting a greater amount of information therebetween. Alternatively, the ATU-R and ATU-C could be designed to use the "frequency split scheme" in such a manner as to increase the bandwidth of the ADSL system to an even greater extent.

In a first alternative embodiment of the present invention, the communication link comprises a hybrid fiber/coaxial cable distribution system. This system includes a head end that is connected to a plurality of nodes via a high-speed fiber optic backbone. Each of these nodes is in turn connected to a plurality of subscriber homes via two or more coaxial cables. At each subscriber home, a splitter is provided to divide the signal transmitted over the coaxial cables between a TV set top box for the provision of cable television programming and a cable modem for the provision of high-speed Internet services. In this embodiment, the head end and cable modems are designed to use the "frequency split scheme" and "frequency foldback scheme" for the purpose of extending the operating range of the distribution system, while at the same time increasing the bandwidth of the system to thereby serve a greater number of homes off the coaxial cable line.

In a second alternative embodiment of the present invention, the communication link comprises a fiber optic system in which a modulator communicates with a demodulator via two or more fiber optic cables. The fiber optic cables may consist of either multi-mode or single-mode fiber optic cables, depending upon the application. Alternatively, the "hard-wired" fiber optic cables could be replaced by a switched optical network, whereby wavelength-division multiplexing is used to transmit multiple optical signals having different wavelengths over the same fiber optic cables. In this embodiment, the modulator and demodulator are designed to use the "frequency split scheme" and "frequency foldback scheme" for the purpose of extending the operating range of the fiber optic system, while at the same time increasing the bandwidth of the fiber optic system to thereby enable the transmission of higher data rates.

In a third alternative embodiment of the present invention, the communication link comprises a radio system in which a modulator communicates with a demodulator via two or more RF paths. The RF paths may consist of any fixed "band-limited" path, such as a 30 MHz path used for the transmission of an HDTV signal, a 6 MHz path used for the transmission of a television signal, a 15 kHz path used for the transmission of an FM radio signal, or a 5 kHz path used for the transmission of an AM radio signal. Alternatively, the RF paths may consist of CDMA radio channels, wherein each channel consists of a particular frequency/pseudo-random number sequence. In this embodiment, the modulator and demodulator are designed to use the "frequency split scheme" and/or "frequency foldback scheme" for the purpose of extending the operating range and/or increasing the bandwidth of the radio system.

The present invention will be better understood from the following detailed description of the preferred and alternative embodiments, read in connection with the drawings as hereinafter described.

DESCRIPTION OF THE DRAWINGS

FIG. 7 is a functional block diagram of the transmitter of the ATU-C of FIG. 4.

FIG. 8 is a functional block diagram of the receiver of the ATU-R of FIG. 4.

DETAILED DESCRIPTION OF THE PREFERRED EMBODIMENTS

The present invention is directed to a system and method for extending the operating range and/or increasing the bandwidth of a communication link. In a preferred embodiment, the communication link comprises an ADSL system in which an ATU-R communicates with an ATU-C over two or more metallic twisted wire pairs. In various alternative embodiments, the communication link comprises a hybrid fiber/coaxial cable distribution system, a fiber optic system, and a radio system. In all of these embodiments, a "frequency split scheme" and/or "frequency foldback scheme" are used to extend the operating range and/or increase the bandwidth of the communication link. While the present invention will be described in detail hereinbelow with reference to these preferred and alternative embodiments, it should be understood that the invention could be applied to any communication link in which two communication devices are connected by two or more "band-limited" communication paths for the transmission of information therebetween.

Preferred Embodiment

Figure 1:
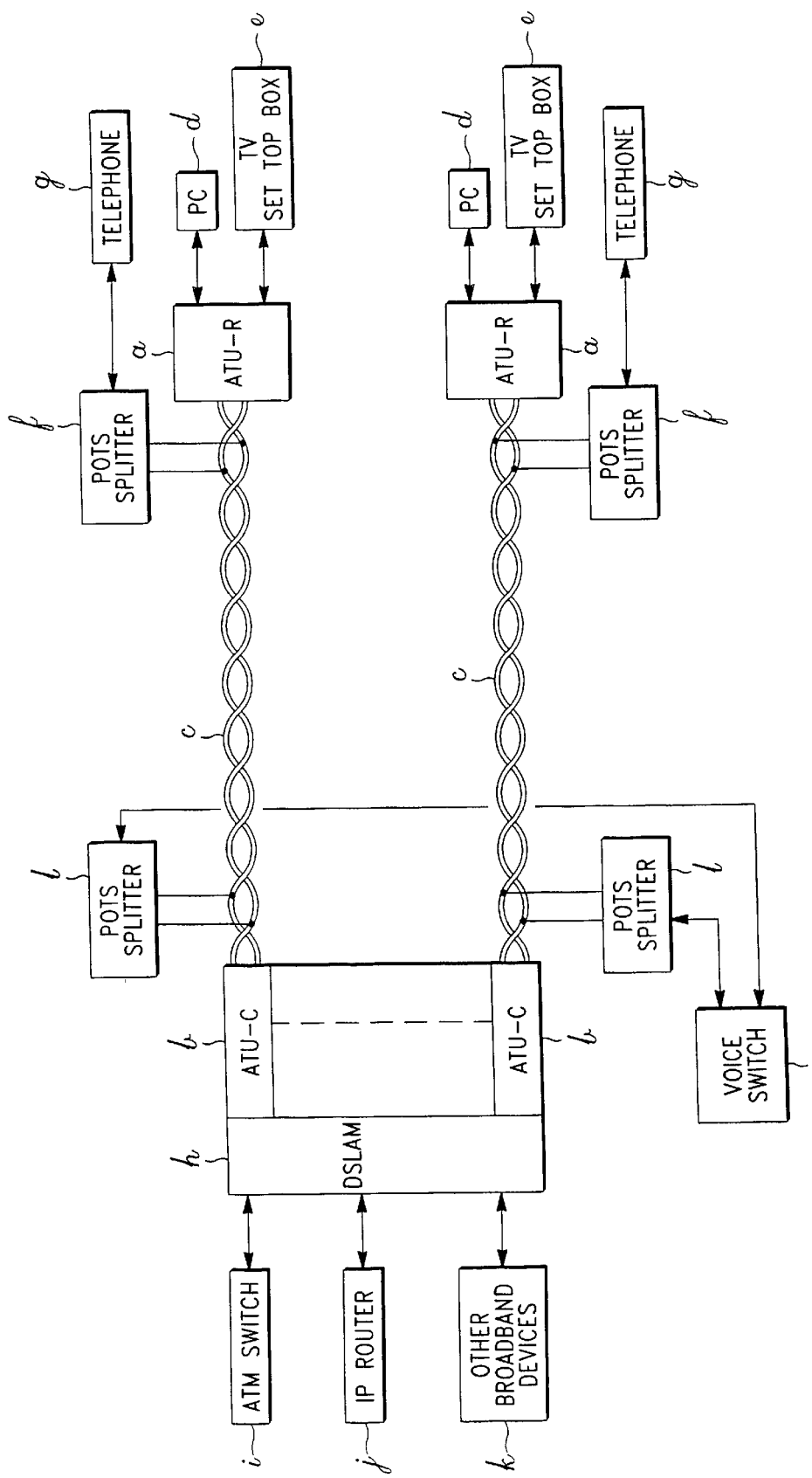
FIG. 1 is a block diagram of an ADSL system in accordance with the prior art.
Figure 2:
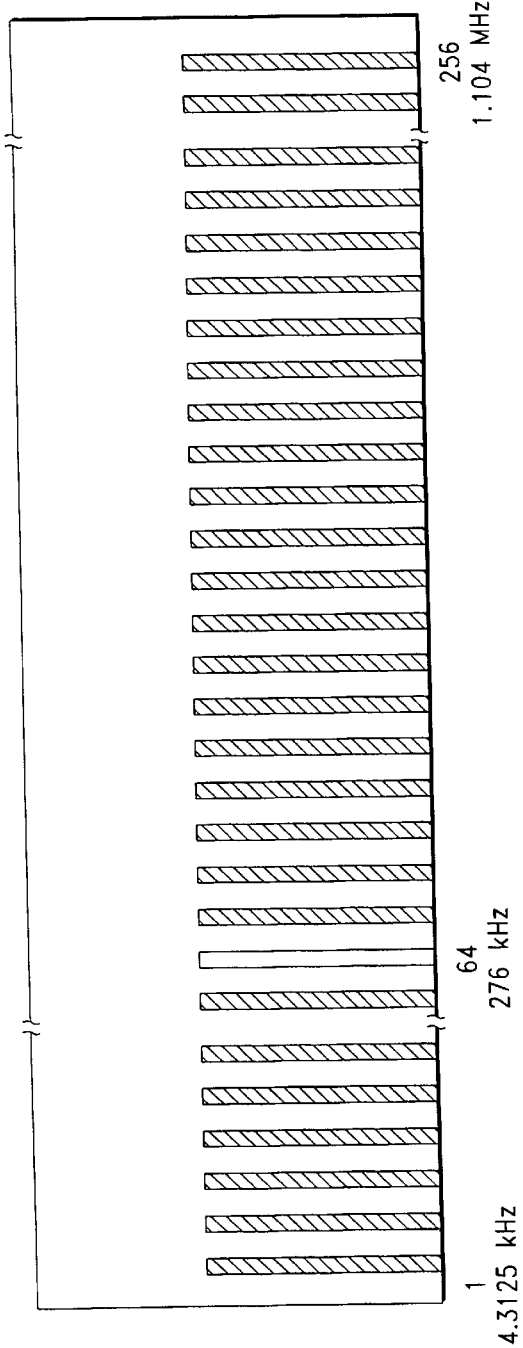
FIG. 2 is a DMT subcarrier layout of the signal transmitted between the ATU-R and ATU-C of FIG. 1.
Figure 3:
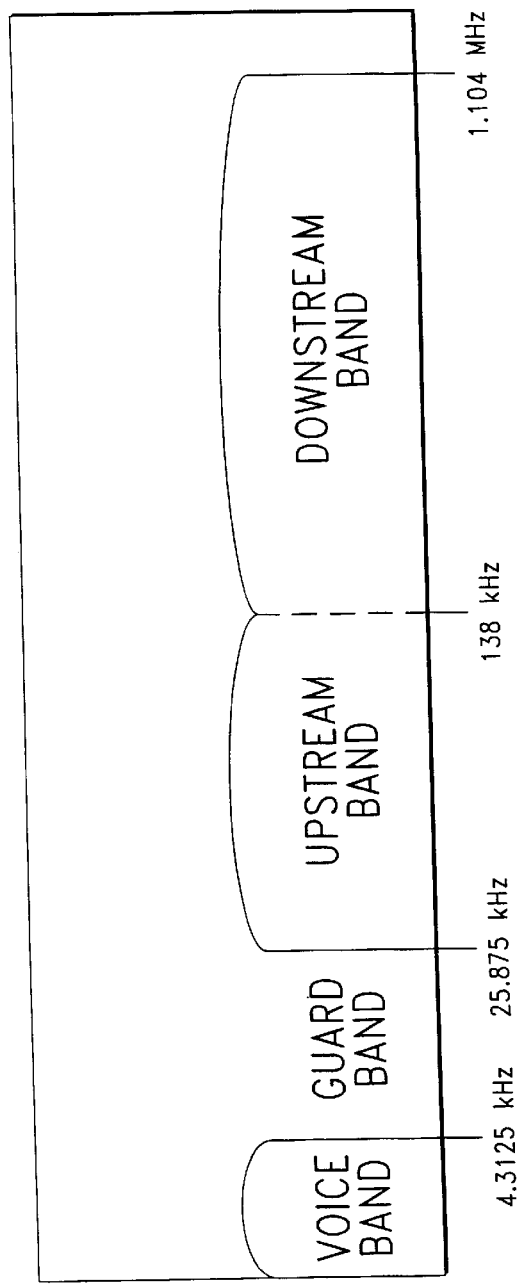
FIG. 3 is a frequency spectrum placement chart of the signal transmitted between the ATU-R and ATU-C of FIG. 1.
Figure 4:
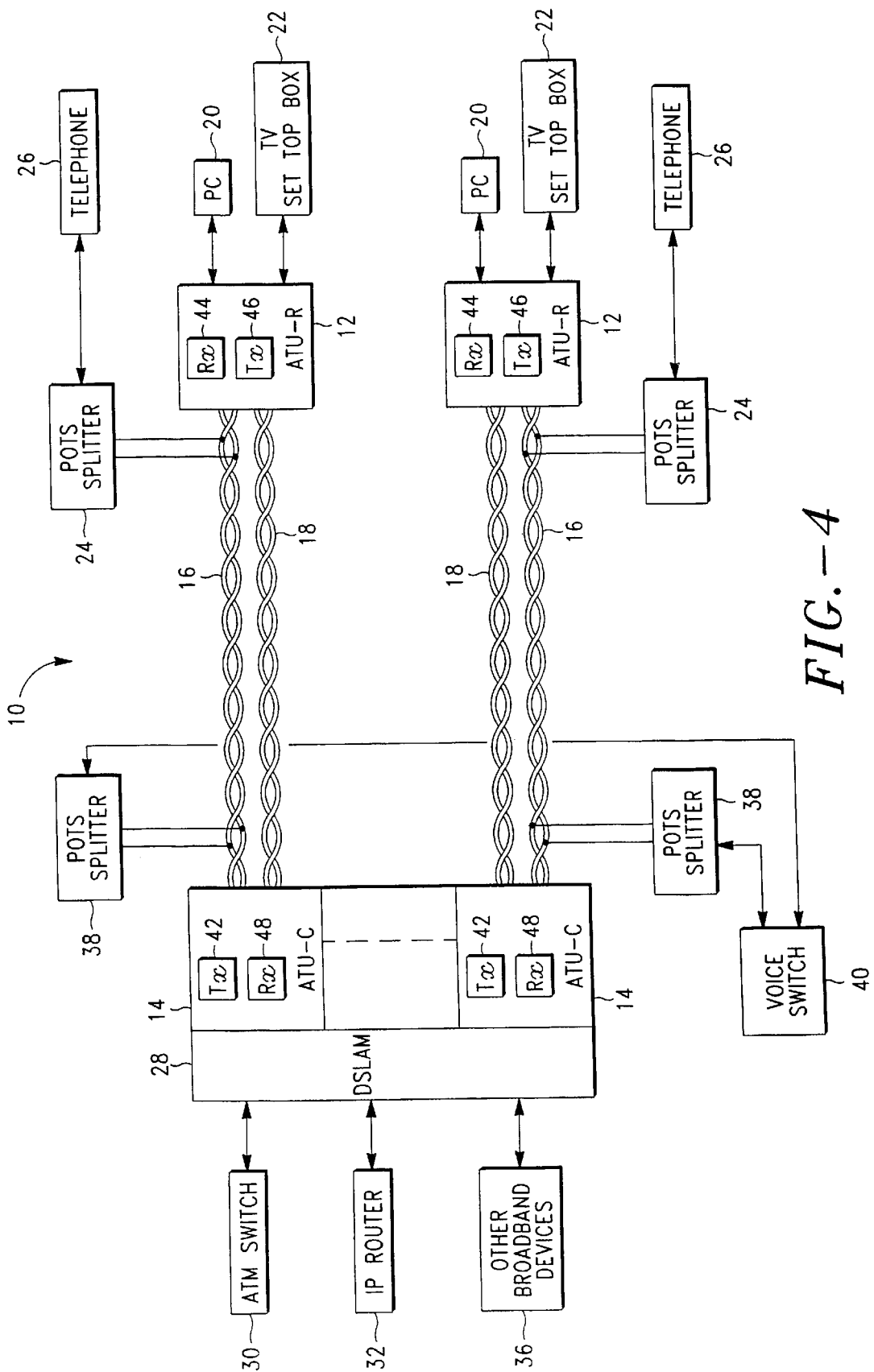
FIG. 4 is a block diagram of an ADSL system in accordance with a preferred embodiment of the present invention.

Referring to FIG. 4, an ADSL system in accordance with a preferred embodiment of the present invention is designated generally as reference numeral 10. ADSL system 10 includes a plurality of remote ADSL transceiver units ("ATU-R") 12 located at various homes and businesses, and a plurality of complimentary central office ADSL transceiver units ("ATU-C") 14 located at the telephone company central office. In the illustrated embodiment, each ATU-R 12 communicates with each ATU-C 14 over a first twisted wire pair 16 and a second twisted wire pair 18. It should be understood, however, that additional twisted wire pairs could also be used in accordance with the invention, such as three, four, five or even six twisted wire pairs. In other words, ATU-R 12 and ATU-C 14 may be connected by "n" twisted wire pairs, wherein "n" is an integer equal to 2, 3, 4, 5, 6, etc. Preferably, the twisted wire pairs consist of the same copper twisted wire pairs that are currently used for the provision of POTS.

At each of the various homes and businesses, ATU-R 12 can be linked to a PC 20 for the provision of high-speed Internet services, to a TV set top box 22 for the provision of video services (e.g. movies-on-demand or HDTV), and/or to any other type of broadband device. A POTS splitter 24 may also be provided to filter out the 4 kHz analog voice signal and route it to an existing analog telephone 26. Alternatively, POTS splitter 24 may be integrated within ATU-R 12.

At the telephone company central office, each ATU-C 14 is connected to a DSLAM 28, which concentrates and/or switches the various data signals and routes them to their appropriate destination, such as an ATM switch 30, an IP router 32, or other broadband devices 36. All of these devices are in turn connected to a broadband network. A POTS splitter 38 may also be provided to filter out the 4 kHz analog voice signal and route it to a voice switch 40 of the PSTN. Alternatively, POTS splitter 38 may be integrated within ATU-C 14.

In a first aspect of the present invention, ATU-R 12 and ATU-C 14 are designed to use the "frequency split scheme" and "frequency foldback scheme" to enable the transmission of high speed Internet and other broadband services to homes and businesses that are located at greater distances from the telephone company central office. While the use of these schemes will be described in detail hereinbelow with reference to DMT line coding, it should be understood that other line coding techniques could also be used in accordance with the present invention, such as carrierless amplitude/phase modulation ("CAP") and quadrature amplitude modulation ("QAM").

Figure 5:
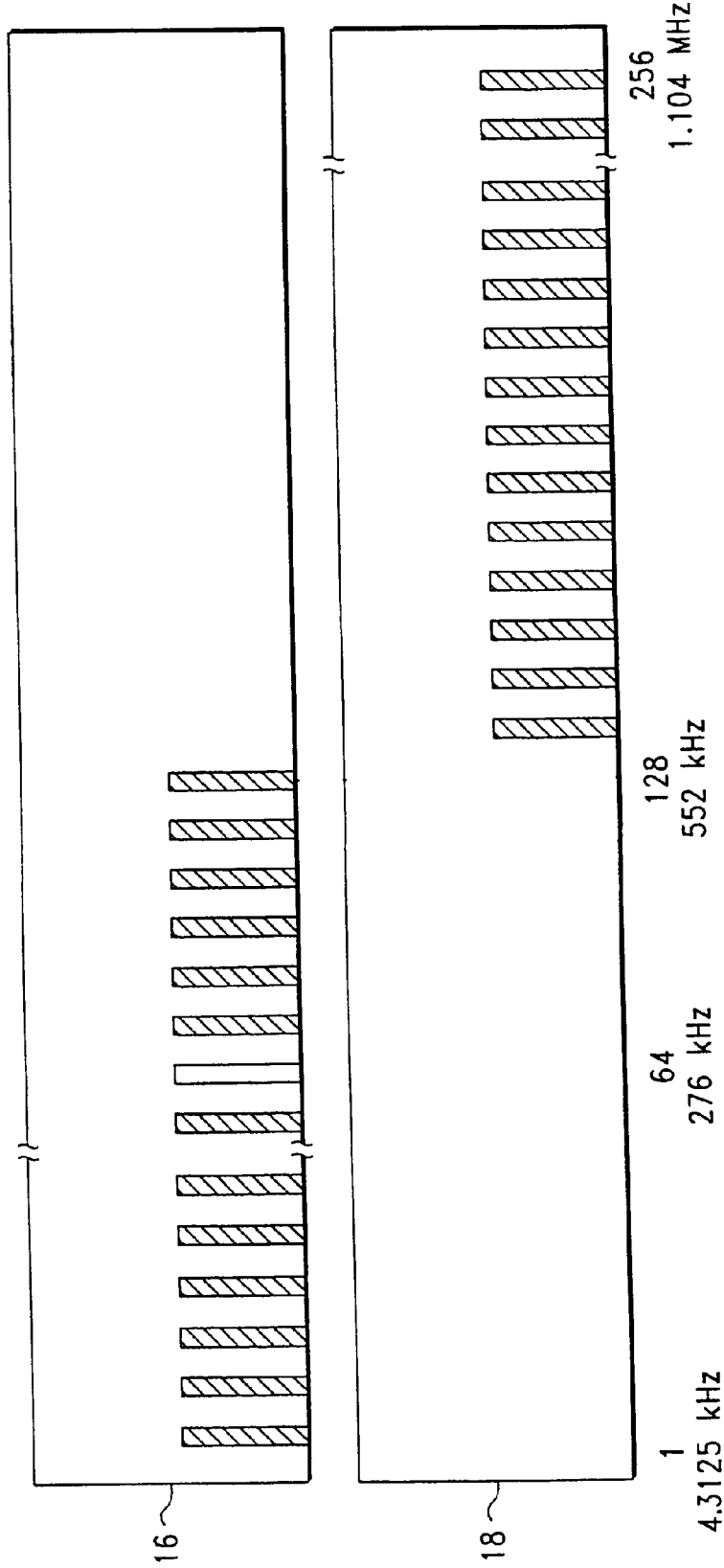
FIGS. 5 and 6 are DMT subcarrier layouts of the signal transmitted between the ATU-R and ATU-C of FIG. 4, illustrating the use of the "frequency split scheme" and the "frequency foldback scheme" to extend the operating range and increase the bandwidth of the ADSL system in accordance with a first aspect of the present invention

As shown in FIG. 5, the "frequency split scheme" is designed to divide the information transmitted between ATU-R 12 and ATU-C 14 into a first signal for transmission over twisted wire pair 16 and a second signal for transmission over twisted wire pair 18. In the illustrated embodiment, the information that would typically be carried in the lower frequency subcarriers of a single twisted wire pair is assigned to subcarrier #'s 1–128 of twisted wire pair 16, and the information that would typically be carried in the higher frequency subcarriers of a single twisted wire pair is assigned to subcarrier #'s 129–256 of twisted wire pair 18. Of course, if additional twisted wire pairs were used, the "frequency split scheme" could be designed to divide the information into "n" signals for transmission over "n" twisted wire pairs.

Figure 6:
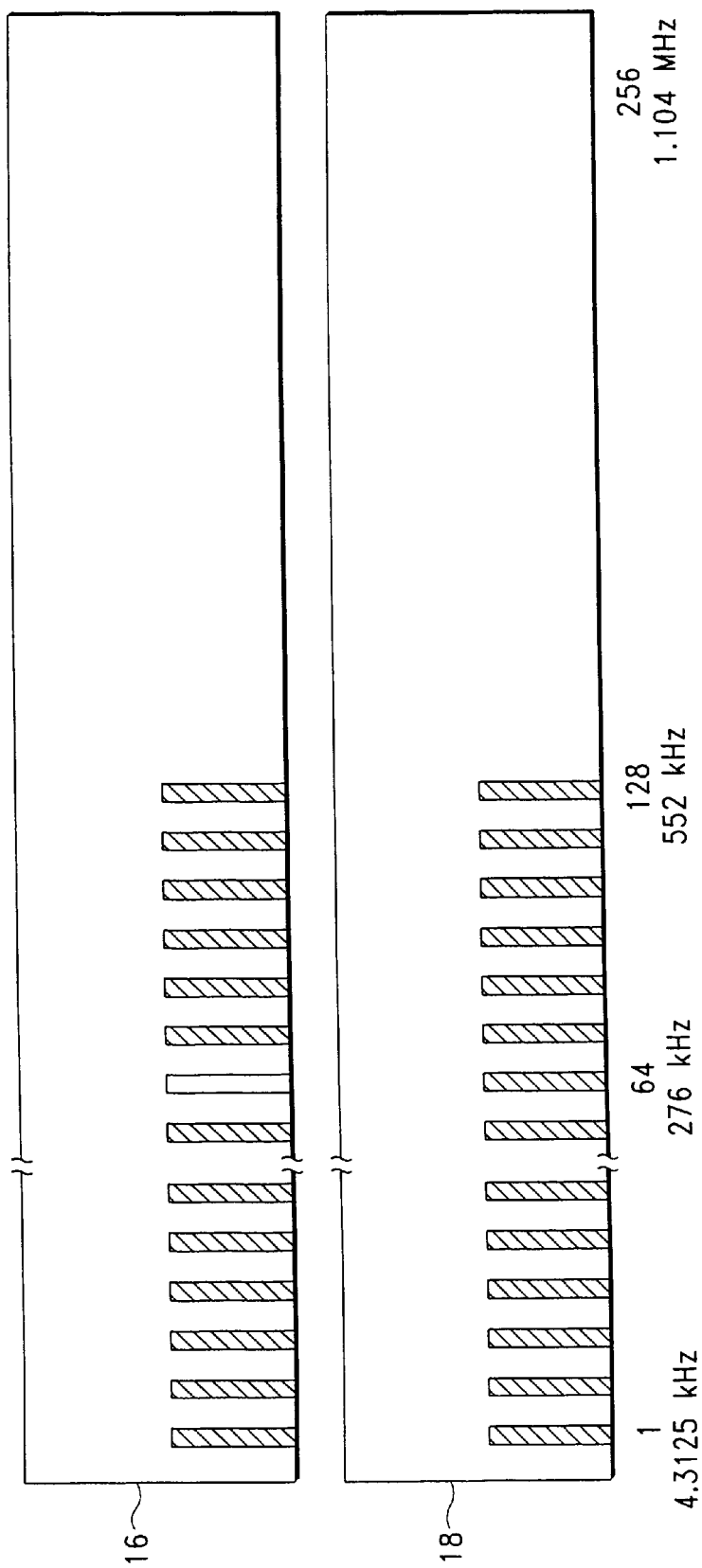

As shown in FIG. 6, the "frequency foldback scheme" is designed to shift all of the information from the higher frequency subcarriers to the lower frequency subcarriers of twisted wire pair 18, thereby taking advantage of the fact that more information can be carried in the lower frequency subcarriers. For example, in the illustrated embodiment, subcarrier #'s 1–128 of twisted wire pair 18 will be able to carry the information that was originally assigned to subcarrier #'s 129–256 of twisted wire pair 18, plus additional information. As such, the "frequency foldback scheme" optimizes the use of the lower frequency subcarriers to thereby transmit a greater amount of information over twisted wire pair 18. Of course, if additional twisted wire pairs were used, the "frequency foldback scheme" could be designed to shift the information from the higher frequency subcarriers to the lower frequency subcarriers of each additional pair.

By using the "frequency split scheme" and "frequency foldback scheme" as described above, it is possible to increase the power level of each of the signals transmitted over twisted wire pairs 16 and 18 to thereby increase the distance that the signals can travel. This distance will vary according to the data rate being offered, the gauge and generation of twisted wire pairs 16 and 18, the number of bridged taps and other factors. However, the following calculations will illustrate the approximate distances that can be achieved in accordance with the present invention.

With reference to "test loop 7" of the ANSI T1.413 (1995) standard, it is known that the loss (i.e. attenuation) of a signal transmitted between conventional ADSL transceiver units located 13.5 kft apart over a single twisted wire pair is approximately 32 dB at 20 kHz and approximately 116 dB at 1.104 MHz. By contrast, if ATU-R 12 and ATU-C 14 are used to transmit this same signal over twisted wire pairs 16 and 18, the signal loss can be improved by a total of 6 dB (i.e. 3 dB per twisted wire pair) such that the loss will be approximately 26 dB at 20 kHz (an improvement of 18.75%) and approximately 110 dB at 1.104 MHz (an improvement of 5.17%). These percentages result in an average improvement of 11.96%, which is a conservative estimate in view of the fact that all of the information is carried in the lower frequency subcarriers of the twisted wire pairs through the use of the "frequency foldback scheme." Applying this percentage to 13.5 kft, it can be seen that the transmission distance will increase by approximately 1.614 kft, resulting in a total distance of approximately 15.115 kft. As such, the transmission distance between ATU-R 12 and ATU-C 14 can be extended from 13.5 kft to approximately 15.115 kft simply by using two twisted wire pairs.

The use of additional twisted wire pairs would allow ATU-R 12 and ATU-C 14 to be located even further apart. For example, if three twisted wire pairs were used, the signal loss could be improved by a total of 9 dB (i.e. 3 dB per twisted wire pair) such that the loss would be approximately 23 dB at 20 kHz (an improvement of 28.125%) and approximately 107 dB at 1.104 MHz (an improvement of 7.76%). These percentages result in an average improvement of 17.94%, which again is a conservative estimate. Applying this percentage to 13.5 kft, it can be seen that the transmission distance would increase by approximately 2.422 kft, resulting in a total distance of approximately 15.922 kft. As such, the transmission distance between ATU-R 12 and ATU-C 14 could be extended from 13.5 kft to approximately 15.922 kft with the use of three twisted wire pairs. Of course, the use of four, five or even six twisted wire pairs would result in an even greater increased distance between ATU-R 12 and ATU-C 14.

Thus, it can be seen that the "frequency split scheme" and "frequency foldback scheme" are used to increase the transmission distance between ATU-R 12 and ATU-C 14, while at the same time allowing a greater amount of information to be carried in the lower frequency subcarriers of the twisted wire pairs. While the illustrated embodiment shows one particular application of these schemes (see FIGS. 5 and 6), it should be understood that other applications are also possible whereby the use of these schemes involves a trade-off between extending the operating range and/or improving the bandwidth of ADSL system 10.

It should also be noted that ATU-R 12 and ATU-C 14 could alternatively be designed to use only the "frequency split scheme" (without the "frequency foldback scheme") to extend the operating range of ADSL system 10 (see FIG. 5). By doing so, it would still be possible to increase the power level of each of the signals transmitted over the twisted wire pairs to thereby increase the distance that the signals can travel. However, because the lower frequency subcarriers would not be fully utilized, the advantage of transmitting more information over the twisted wire pairs would not be achieved.

Referring again to FIG. 4, it can be seen that each ATU-C 14 includes a transmitter 42 that communicates with a receiver 44 of ATU-R 12 for the transmission of information in the downstream direction. Likewise, each ATU-R 12 includes a transmitter 46 that communicates with a receiver 48 of ATU-C 14 for the transmission of information in the upstream direction. While transmitters 42 and 46 and receivers 44 and 48 will be described in detail hereinbelow with reference to their functionality, it should be apparent to one skilled in the art that the actual circuit design of such transmitters and receivers could be adapted from conventional ADSL transmitters and receivers that comply with the ANSI T1.413 (1995) standard, with a minimum of circuit modification.

Referring to FIG. 7, transmitter 42 of ATU-C 14 is shown in functional block diagram form to illustrate the transmission of data signals in the downstream direction to receiver 44 of ATU-R 12. As can be seen, transmitter 42 generally includes a "Tone Order and Constellation Encoder" function block 50, an "Inverse Discrete Fourier Transform ("IDFT")" function block 52, first and second "Add Cyclic Prefix" function blocks 54 and 56, and first and second "Digital-to-Analog Converter ("DAC") and Filter" function blocks 58 and 60. It should be understood that transmitter 42 additionally performs all of the other functions defined by the ANSI T1.413 (1995) standard, which have been omitted for ease of discussion.

Within the "Tone Order and Constellation Encoder" function block 50, twisted wire pairs 16 and 18 are first probed to determine which DMT subcarriers can be used for the transmission of data from ATU-C 14 to ATU-R 12. Any subcarriers that have been affected by a bridged tap, radio-frequency noise, impulse noise and the like will not be used. Of course, if more than two twisted wire pairs are used, those pairs would be probed as well.

Next, a tone ordering and encoding algorithm is used to assign data bits to the available DMT subcarriers in accordance with the "frequency split scheme" and "frequency foldback scheme" of the present invention. In this implementation, the portion of the frequency spectrum of twisted wire pair 16 between 25.875 kHz and 552 kHz (i.e. subcarrier #'s 7–128) and the portion of the frequency spectrum of twisted wire pair 18 between 0 Hz and 552 kHz (i.e. subcarrier #'s 1–128) are used to carry data from ATU-C 14 to ATU-R 12. Of course, other frequency spectrums are equally applicable to the invention. Finally, an output is generated consisting of 256 complex values (having both real and imaginary symbols), which is sent to the "IDFT" function block 52.

Within the "IDFT" function block 52, the 256 complex values received from the "Tone Order and Constellation Encoder" function block 50 are converted into a corresponding time domain representation consisting of 512 real values. These 512 real values are then divided into two sets of digital words, each consisting of 256 real values. The first set of digital words is sent to the first "Add Cyclic Prefix" function block 54, and the second set of digital words is sent to the second "Add Cyclic Prefix" function block 56.

Within the first "Add Cyclic Prefix" function block 54, a cyclic prefix is added to the first set of digital words received from the "IDFT" function block 52. As will be seen, the first "Strip Cyclic Prefix" function block 66 of receiver 44 uses this cyclic prefix for error checking and correction at the other end. The first set of digital words (with cyclic prefix) is then sent to the first "DAC and Filter" function block 58.

Similarly, within the second "Add Cyclic Prefix" function block 56, a cyclic prefix is added to the second set of digital words received from the "IDFT" function block 52. Again, it will be seen that the second. "Strip Cyclic Prefix" function block 68 of receiver 44 uses this cyclic prefix for error checking and correction at the other end. The second set of digital words (with cyclic prefix) is then sent to the second "DAC and Filter" function block 60.

Within the first "DAC and Filter" function block 58, a DAC is used to convert the first set of digital words (with cyclic prefix) received from the first "Add Cyclic Prefix" function block 54 into corresponding tones. These tones are then passed through a filter having a pass band between 25.875 kHz and 552 kHz and coupled to twisted wire pair 16.

Similarly, within the second "DAC and Filter" function block 60, a DAC is used to convert the second set of digital words (with cyclic prefix) received from the second "Add Cyclic Prefix" function block 56 into corresponding tones. These tones are then passed through a filter having a pass band between 0 Hz and 552 kHz and coupled to twisted wire pair 18.

Referring to FIG. 8, receiver 44 of ATU-R 12 is shown in functional block diagram form to illustrate the receipt of data signals from transmitter 42 of ATU-C 14. As can be seen, receiver 44 generally includes first and second "Filter and Analog-to-Digital Converter ("ADC")" function blocks 62 and 64, first and second "Strip Cyclic Prefix" function blocks 66 and 68, a "Discrete Fourier Transform ("DFT")" function block 70, and a "Constellation Decoder and Bit Extraction" function block 72. Again, it should be understood that receiver 44 additionally performs all of the other functions defined by the ANSI T1.413 (1995) standard, which have been omitted for ease of discussion.

Within the first "Filter and ADC" function block 62, the tones received from twisted wire pair 16 are passed through a filter having a passband between 25.875 kHz and 552 kHz. An ADC is then used to convert the filtered tones into a corresponding first set of digital words (with cyclic prefix). This first set of digital words (with cyclic prefix) is then sent to the first "Strip Cyclic Prefix" function block 66.

Similarly, within the second "Filter and ADC" function block 64, the tones received from twisted wire pair 18 are passed through a filter having a passband between 0 Hz and 552 kHz. An ADC is then used to convert the filtered tones into a corresponding second set of digital words (with cyclic prefix). This second set of digital words (with cyclic prefix) is then sent to the second "Strip Cyclic Prefix" function block 68.

Within the first "Strip Cyclic Prefix" function block 66, the cyclic prefix is stripped from the first set of digital words received from the first "Filter and ADC" function block 62. This cyclic prefix is checked to determine if there were any errors in the transmission of tones over twisted wire pair 16. Such errors could be caused, for example, by a power transformer, an AM radio station, or a ham radio that were not detected when twisted wire 16 was probed by the "Tone Order and Constellation Encoder" function block 50 of transmitter 42. This first set of digital words (consisting of 256 real values) is then sent to the "DFT" function block 70.

Similarly, within the second "Strip Cyclic Prefix" function block 68, the cyclic prefix is stripped from the second set of digital words received from the second "Filter and ADC" function block 64. As described above, this cyclic prefix is checked to determine if there were any errors in the transmission of tones over twisted wire pair 18. This second set of digital words (consisting of 256 real values) is then sent to the "DFT" function block 70.

Within the "DFT" function block 70, the first and second sets of digital words received from the first and second "Strip Cyclic Prefix" function blocks 66 and 68 are combined into a single set of digital words and converted into a corresponding frequency domain representation consisting of 256 complex values (having both real and imaginary symbols). These 256 complex values are then sent to the "Constellation Decoder and Bit Extraction" function block 72.

Within the "Constellation Decoder and Bit Extraction" function block 72, a decoding and bit extraction algorithm is applied to the 256 complex values received from the "DFT" function block 70. This algorithm is used to remove the data bits from the assigned subcarriers of twisted wire pairs 16 and 18 in accordance with the "frequency split scheme" and "frequency foldback scheme" of the present invention. These data bits are then outputted to a PC 20, a TV set top box 22, and/or any other type of broadband device at the home or business.

Turning now to the transmission of data signals in the upstream direction, it should be apparent to one skilled in the art that the functions of transmitter 46 and receiver 48 are substantially the same as the functions of transmitter 42 and receiver 44 described in detail hereinabove, with the notable difference that the upstream data signals are carried in a different portion of the frequency spectrum. For example, in the illustrated embodiment, the upstream data signals are carried in the portion of the frequency spectrum of twisted wire pair 16 between 25.875 kHz and 138 kHz (i.e. subcarrier #'s 7–32). Of course, other frequency spectrums are equally applicable to the invention.

Figure 9:
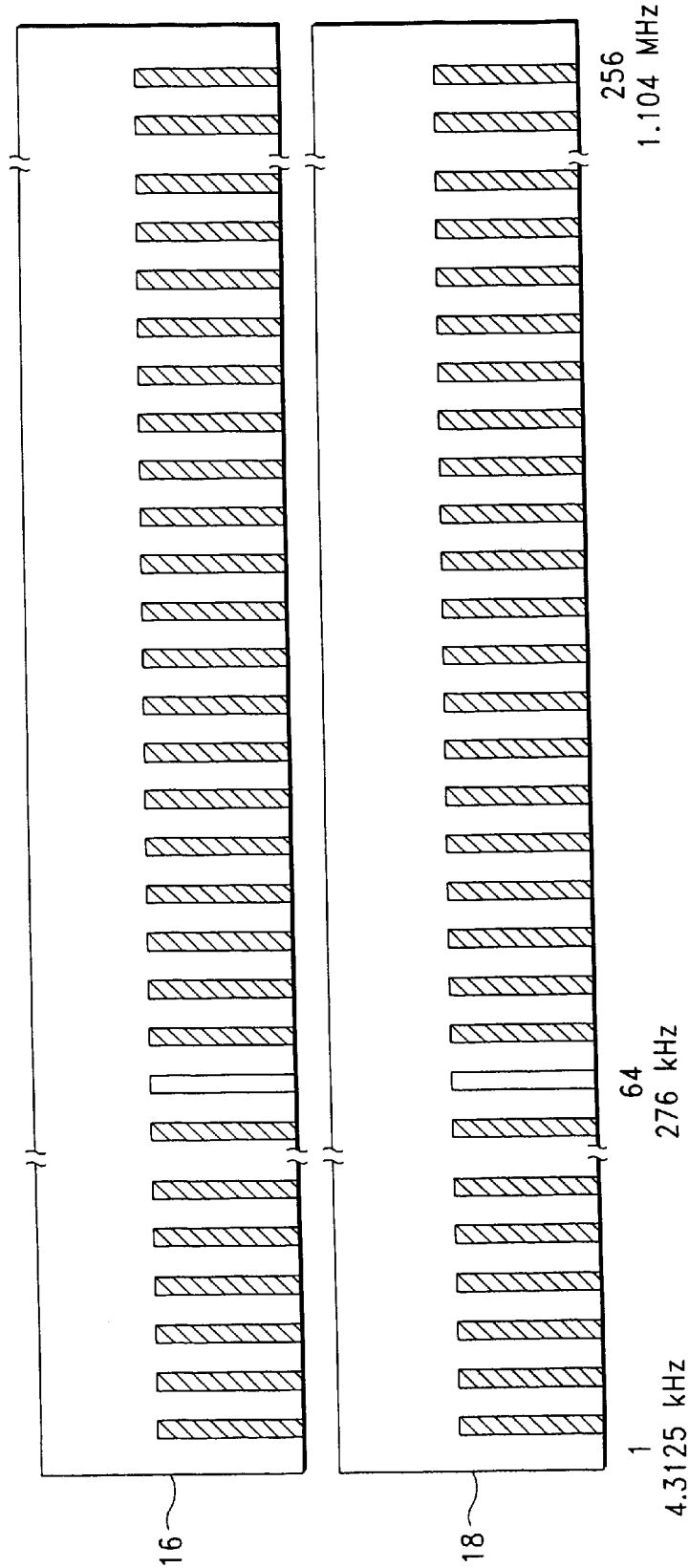
FIG. 9 is a DMT subcarrier layout of the signal transmitted between the ATU-R and ATU-C of FIG. 4, illustrating the use of the "frequency split scheme" to greatly increase the bandwidth of the ADSL system in accordance with a second aspect of the present invention.

Referring again to FIG. 4, in a second aspect of the present invention, ATU-R 12 and ATU-C 14 could alternatively be designed to use the "frequency split scheme" in such a manner as to enable the provision of very high speed Internet and other broadband services that require a communication link of 6 Mb/s or greater, such as HDTV, high-performance business applications and the like. As shown in FIG. 9, instead of utilizing only the lower frequency subcarriers of twisted wire pairs 16 and 18, all 256 of the subcarriers are utilized (while keeping the power level the same) to thereby increase the amount of information transmitted between ATU-R 12 and ATU-C 14 to an even greater extent. Of course, the use of three, four, five, or even six twisted wire pairs would allow an even greater amount of information to be transmitted between ATU-R 12 and ATU-C 14.

In this second aspect of the present invention, ATU-R 12 and ATU-C 14 utilize transmitters and receivers that are similar to those described above with reference to FIGS. 7 and 8. Although the actual circuit design of such transmitters and receivers could be adapted from conventional ADSL transmitters and receivers with a minimum of circuit modification, it should be apparent to one skilled in the art that such transmitters and receivers would be proprietary (i.e. not in compliance with the ANSI T1.413 standard). As such, vendor interoperability would not be possible without modification of the ANSI T1.413 (1995) standard.

In summary, the "frequency split scheme" and/or "frequency foldback scheme" of the present invention can be used to: 1) increase the transmission distance between ATU-R 12 and ATU-C 14 to thereby provide high speed Internet and other broadband services to homes and businesses that are located at greater distances from the telephone company central office, while at the same time allowing a greater amount of information to be carried in the lower frequency subcarriers of the twisted wire pairs; or 2) increase the amount of information transmitted between ATU-R 12 and ATU-C 14 to an even greater extent to thereby provide very high speed Internet and other broadband services that require a communication link of 6 Mb/s or greater.

Finally, while the preferred embodiment has been described hereinabove with reference to ADSL technology, it should be understood that the "frequency split scheme" and/or "frequency foldback scheme" could also be applied to other xDSL technologies, such as single line DSL ("SDSL"), high data rate DSL ("HDSL2"), rate adaptive DSL ("RADSL"), and very high data rate DSL ("VDSL"). As such, the present invention could be used to extend the operating range and/or increase the bandwidth of these systems as well.

Alternative Embodiments

Figure 10:
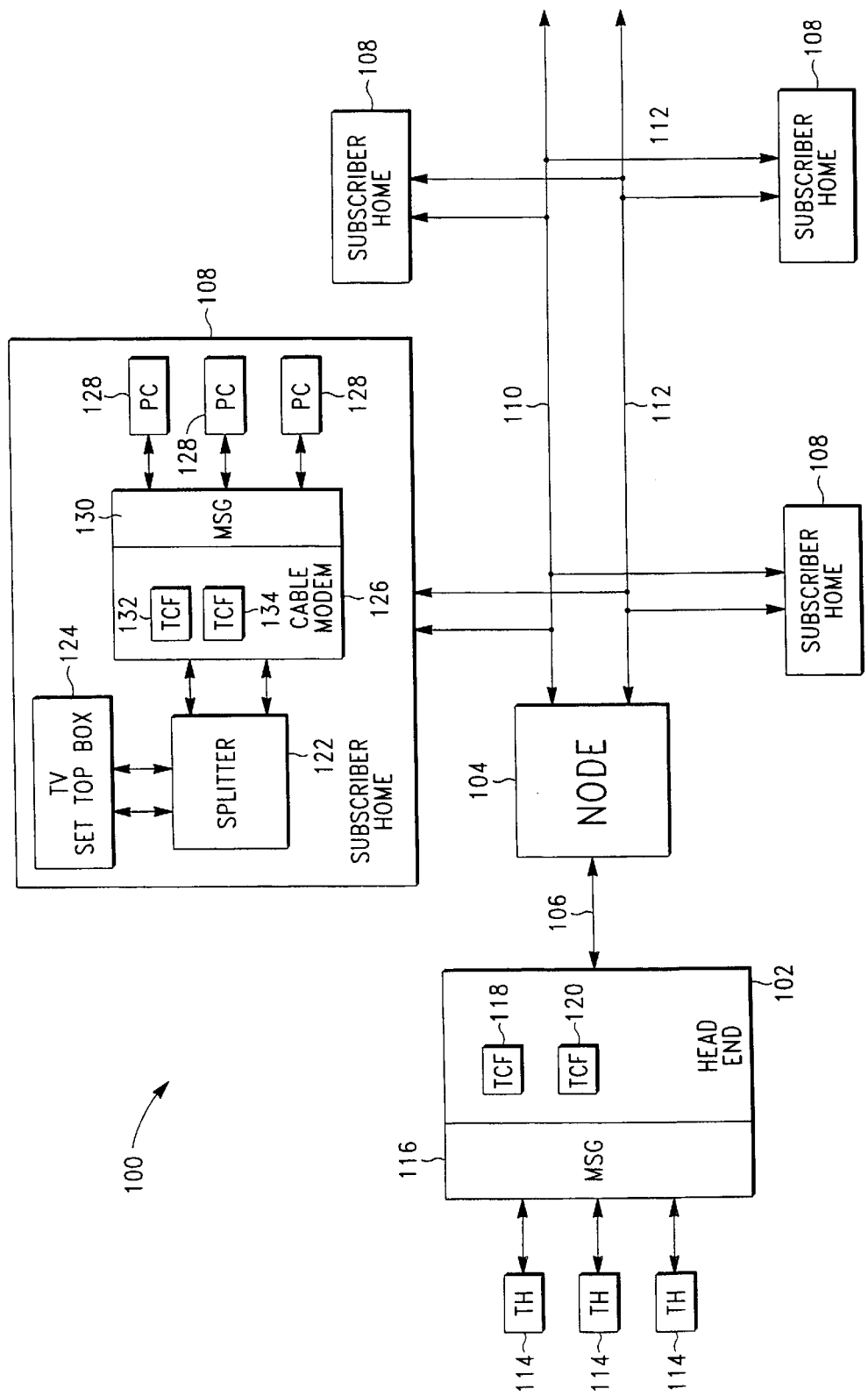
FIG. 10 is a block diagram of a hybrid fiber/coaxial cable distribution system in accordance with a first alternative embodiment of the present invention.

Referring to FIG. 10, a hybrid fiber/coaxial cable distribution system in accordance with a first alternative embodiment of the present invention is designated generally as reference numeral 100. System 100 includes a head end 102 that is connected to a plurality of nodes 104 (only one of which is shown) via a high-speed fiber optic backbone 106. Typically, each node 104 is capable of serving a plurality of subscriber homes 108 located within a neighborhood or community. In the illustrated embodiment, node 104 is connected to subscriber homes 108 via a first coaxial cable 110 and a second coaxial cable 112, which form a tree-and-branch design to serve all of the homes off the same line. Of course, it should be understood that more than two coaxial cables could also be used in accordance with the present invention. In other words, node 104 and subscriber homes 108 may be connected by "n" coaxial cables, wherein "n" is an integer equal to 2, 3, 4, etc. Preferably, the coaxial cables consist of existing coaxial cables that were installed years ago for the transmission of multiple cable channels over the old analog cable television systems.

Head end 102 is preferably designed to deliver both cable television programming and high-speed Internet services to all subscriber homes 108. In this regard, head end 102 is connected to a plurality of traffic handlers 114 through a multiservice gateway 116. Traffic handlers 114 are in turn connected to satellites, Internet servers and the like. Head end 102 also includes two transmission convergence functions 118 and 120 that format the signal for transmission over coaxial cables 110 and 112.

At each subscriber home 108 (only one of which is shown in detail), a splitter 122 is provided to divide the signal transmitted over coaxial cables 110 and 112 between a TV set top box 124 for the provision of cable television programming and a cable modem 126 for the provision of high-speed Internet services. Cable modem 126 is in turn connected to one or more PC's 128 through a multiservice gateway 130. Cable modem 126 also includes two transmission convergence functions 132 and 134 that format the signal for transmission over coaxial cables 110 and 112.

In accordance with the present invention, head end 102 and cable modems 126 are designed to use the "frequency split scheme" and "frequency foldback scheme" described hereinabove for the purpose of enabling the transmission of high-speed Internet services to subscriber homes 108 that are located at greater distances from node 104, while at the same time increasing the bandwidth therebetween to thereby serve a larger number of homes off the coaxial cable line.

In the illustrated embodiment, the "frequency split scheme" is designed to divide the data transmitted between node 104 and subscriber homes 108 into a first signal for transmission over coaxial cable 110 and a second signal for transmission over coaxial cable 112. For example, in one implementation, the odd bytes of the data could be assigned to coaxial cable 110, and the even bytes of the data could be assigned to coaxial cable 112. Of course, if additional coaxial cables were used, the "frequency split scheme" could be designed to divide the data into "n" signals for transmission over "n" coaxial cables.

The "frequency foldback scheme" is designed to shift all of the data from the higher frequencies to the lower frequencies of coaxial cables 110 and 112, thereby taking advantage of the fact that more information can be carried in the lower frequencies. As such, the "frequency foldback scheme" optimizes the use of the lower frequencies to thereby increase the bandwidth between node 104 and subscriber homes 108. As such, more homes can be served off the coaxial cable line. Of course, if additional coaxial cables were used, the "frequency foldback scheme" could be designed to shift the information from the higher frequencies to the lower frequencies of each additional cable.

Finally, it should be understood that the "frequency foldback scheme" is only applicable to systems in which head end 102 and cable modems 126 use an analog modulation technique (e.g. some type of DMT) for the transmission of information therebetween. As is known in the art, the attenuation of a signal modulated with an analog modulation technique is greater at higher frequencies than at lower frequencies. By contrast, the frequency spectrum of a digitally modulated signal is substantially "flat," that is, the attenuation of the signal is the same at lower and higher frequencies. Thus, the use of the "frequency foldback scheme" in connection with a digitally modulated signal would not provide any added benefit.

Figure 11:
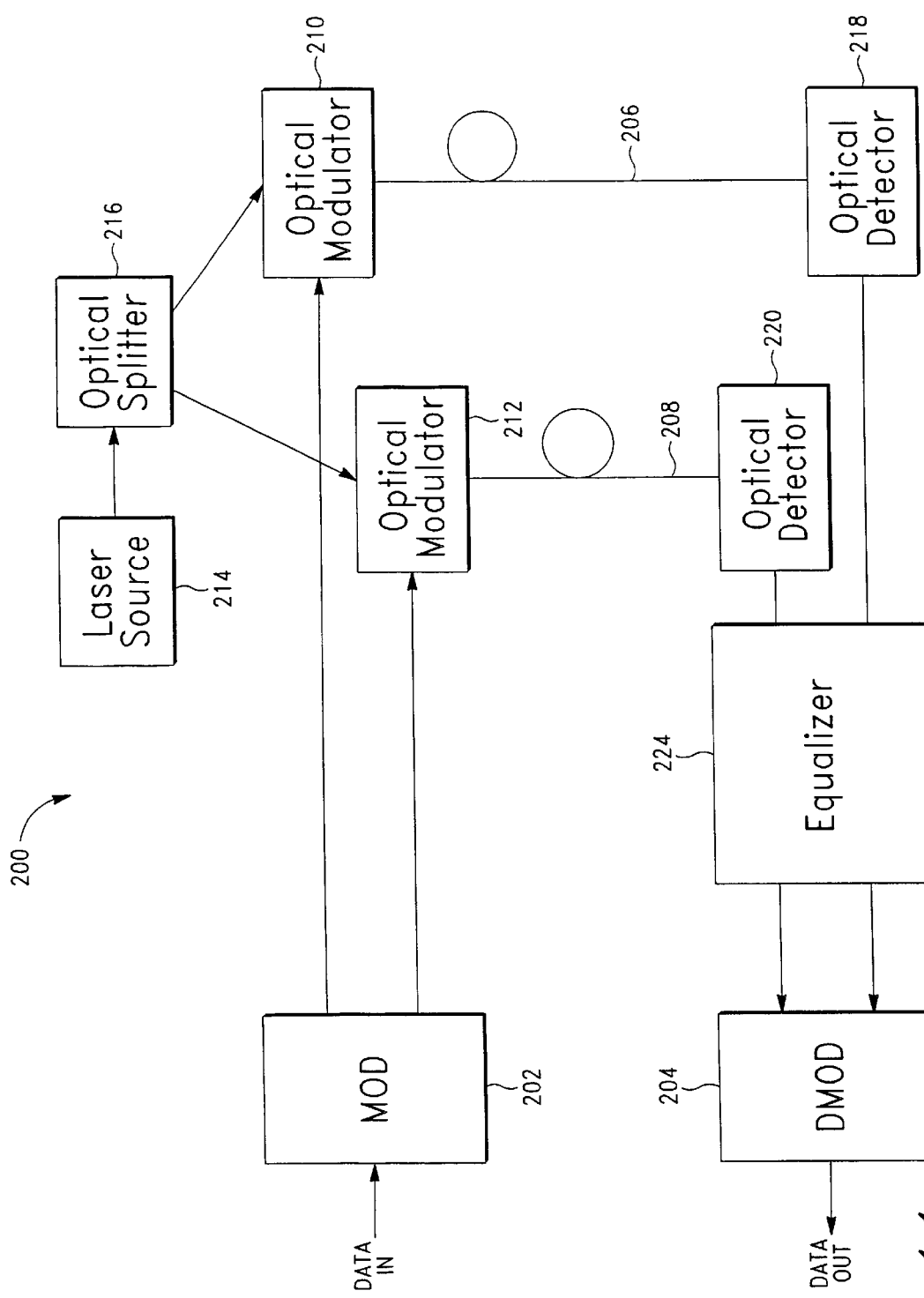
FIG. 11 is a block diagram of a fiber optic system in accordance with a second alternative embodiment of the present invention.

Referring to FIG. 11, a fiber optic system in accordance with a second alternative embodiment of the present invention is designated generally as reference numeral 200. As can be seen, system 200 includes a modulator 202 that communicates with a demodulator 204 via a first fiber optic cable 206 and a second fiber optic cable 208. Of course, it should be understood that more than two fiber optic cables could also be used in accordance with the present invention. In other words, modulator 202 and demodulator 204 may be connected by "n" fiber optic cables, wherein "n" is an integer equal to 2, 3, 4, 5, 6, etc.

Fiber optic cables 206 and 208 may consist of either multi-mode or single-mode fiber optic cables, depending upon the application. Multi-mode fiber optic cables, for example, are typically used in LAN environments, between buildings on a campus, between floors within a building, and the like. On the other hand, single-mode fiber optic cables are typically used in applications that require a greater amount of bandwidth. Alternatively, the "hard-wired" fiber optic cables 206 and 208 of the illustrated embodiment could be replaced by a switched optical network, whereby wavelength-division multiplexing is used to transmit multiple optical signals having different wavelengths over the same fiber optic cables.

In accordance with the present invention, modulator 202 and demodulator 204 are designed to use the "frequency split scheme" and "frequency foldback scheme" described. hereinabove for the purpose of extending the operating range of system 200, while at the same time increasing the bandwidth of system 200 to thereby enable the transmission of higher data rates. Again, it should be understood that the "frequency foldback scheme" is best suited for the transmission of information between modulator 202 and demodulator 204 using an analog modulation technique (e.g. some type of DMT).

It should be understood that the function of modulator 202 is very similar to that of transmitters 42 and 46 of the preferred embodiment, wherein the information transmitted to demodulator 204 is divided into two signals in accordance with the "frequency split scheme" and "frequency foldback scheme" of the present invention. As such, the output of modulator 202 consists of a first electrical signal that is sent to a first optical modulator 210 and a second electrical signal that is sent to a second optical modulator 212.

The first optical modulator 210 receives the first electrical signal from modulator 202 and converts it into a corresponding first optical signal for transmission over fiber optic cable 206. Similarly, the second optical modulator 212 receives the second electrical signal from modulator 202 and converts it into a corresponding second optical signal for transmission over fiber optic cable 208. As is known in the art, a laser source 214 and optical splitter 216 are provided to drive optical modulators 210 and 212, which thereby modulate the intensity of the light based upon the incoming electrical signals. Of course, a separate laser source could be used for each of optical modulators 210 and 212.

At the other end, a first optical detector 218 receives the first optical signal from fiber optic cable 206 and converts it into a corresponding first electrical signal. Similarly, a second optical detector 220 receives the second optical signal from fiber optic cable 208 and converts it into a second electrical signal. These first and second electrical signals are then sent to an equalizer 224.

Equalizer 224 receives the first and second electrical signals from optical detectors 218 and 220 and adjusts the signals to compensate for any differences in the transmission paths of fiber optic cables 206 and 208. For example, if the lengths of fiber optic cables 206 and 208 are not exactly the same, the optical signals will not arrive at optical detectors 218 and 220 at exactly the same time. Equalizer 224 will compensate for this delay. These first and second "equalized" electrical signals are then sent to demodulator 204.

It should be understood that the function of demodulator 204 is very similar to that of receivers 44 and 48 of the preferred embodiment, wherein the data received from modulator 202 is extracted from the first and second "equalized" electrical signals in accordance with the "frequency split scheme" and "frequency foldback scheme" of the present invention. As such, the signal out of demodulator 204 should be identical to the signal into modulator 202.

Finally, although fiber optic system 200 has been described and illustrated hereinabove as a simplex (i.e. one-way) system, it should be apparent to one skilled in the art that the system could easily be adapted to a duplex (i.e. two-way) system, simply by replicating all of the various components in the opposite direction.

Figure 12:
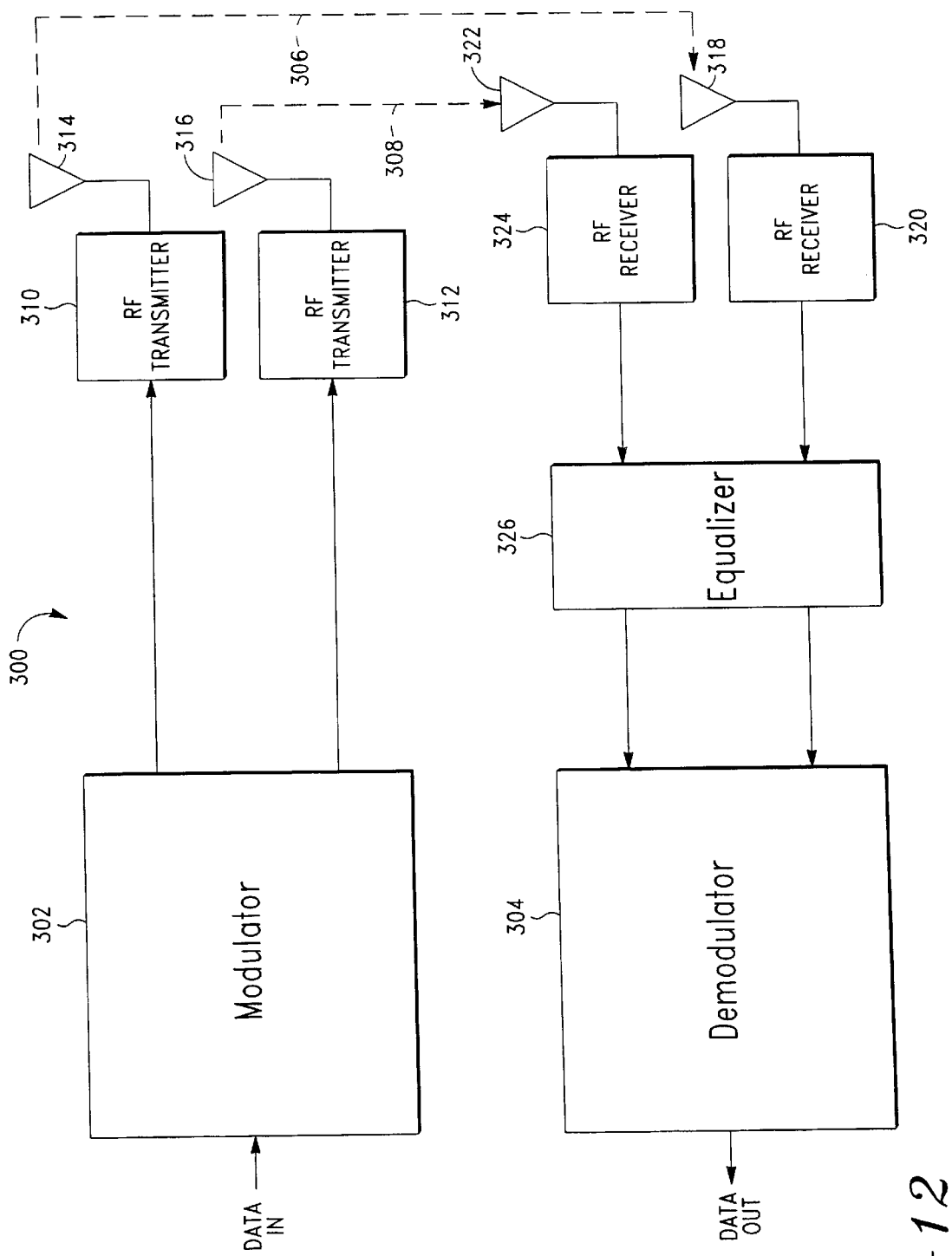
FIG. 12 is a block diagram of a radio system in accordance with a third alternative embodiment of the present invention.

Referring to FIG. 12, a radio system in accordance with a third alternative embodiment of the present invention is designated generally as reference numeral 300. As can be seen, radio system 300 includes a modulator 302 that communicates with a demodulator 304 via a first RF path 306 and a second RF path 308. Of course, it should be understood that more than two RF paths could also be used in accordance with the present invention. In other words, modulator 302 and demodulator 304 maybe connected by "n" RF paths, wherein "n" is an integer equal to 2, 3, 4, 5, 6, etc. Of course, the particular frequencies of the RF paths would typically be regulated by the FCC.

RF paths 306 and 308 may consist of a fixed "bandlimited" RF path, such as a 30 MHz path used for the transmission of an HDTV signal, a 6 MHz path used for the transmission of a television signal, a 15 kHz path used for the transmission of an FM radio signal, or a 5 kHz path used for the transmission of an AM radio signal. Alternatively, RF paths 306 and 308 may consist of CDMA radio channels, wherein each channel consists of a particular pseudo-random number ("PN") sequence on a particular frequency. For example, RF paths 306 and 308 may consist of different PN sequences on the same frequency, the same PN sequence on different frequencies, or different PN sequences on different frequencies. Of course, other cellular or PCS technologies could also be used in accordance with the present invention.

In accordance with the first aspect of the present invention, modulator 302 and demodulator 304 are designed to use the "frequency split scheme" and "frequency foldback scheme" described hereinabove for the purpose of extending the operating range of radio system 300, while at the same time increasing the bandwidth of system 300. It should be noted that if the operating range of radio system 300 is extended, a fewer number of modulators, RF transmitters, RF receivers, equalizers, and demodulators (all of which are described hereinbelow) would be required for the transmission of signals over the RF paths.

Alternatively, in accordance with the second aspect of the present invention, modulator 302 and demodulator 304 could be designed to use only the "frequency split scheme" (without the "frequency foldback scheme") in such a manner as to increase the bandwidth of radio system 300 to an even greater extent. By doing so, a particular customer (e.g. a CDMA customer) could receive a higher speed signal over the RF paths, or, more customers (e.g. HDTV customers) could be served off the same RF paths.

Thus, it can be seen that the use of the "frequency split scheme" and/or "frequency foldback scheme" of the present invention involves a trade-off between extending the operating range and/or improving the bandwidth of radio system 300.

It should be understood that the function of modulator 302 is very similar to that of transmitters 42 and 46 of the preferred embodiment, wherein the information transmitted to demodulator 304 is formatted for transmission over RF paths 306 and 308 in accordance with the "frequency split scheme" and/or "frequency foldback scheme" of the present invention. If the data to be transmitted over RF paths 306 and 308 is governed by a standard (e.g. the standard for the transmission of an HDTV signal or a CDMA signal), the data will preferably be formatted in conformance with such standard. Otherwise, the formatting of the data will of course be proprietary. In either case, the output of modulator 302 consists of a first modulated signal that is sent to a first RF transmitter 310 and a second modulated signal that is sent to a second RF transmitter 312.

The first RF transmitter 310 receives the first modulated signal from modulator 302 and generates a corresponding first RF signal, which is transmitted over RF path 306 via antenna 314. Similarly, the second RF transmitter 312 receives the second modulated signal from modulator 302 and generates a corresponding second RF signal, which is transmitted over RF path 308 via antenna 316. Of course, the same antenna could be used for both RF transmitters.

At the other end, a first antenna 318 intercepts the first RF signal from RF path 306 and directs it to a first RF receiver 320, which generates a corresponding first modulated signal. Similarly, a second antenna 322 intercepts the second RF signal from RF path 308 and sends it to a second RF receiver 324, which generates a corresponding second modulated signal. RF receivers 320 and 324 then send the first and second modulated signals to an equalizer 326.

Equalizer 326 receives the first and second modulated signals from RF receivers 320 and 324 and adjusts the signals to compensate for any differences between RF paths 306 and 308. For example, antennas 318 and 322 may not intercept the first and second RF signals at exactly the same time due to differences in RF paths 306 and 308 caused by wind, rain and the like. Equalizer 326 will compensate for this delay. These first and second "equalized" modulated signals are then sent to demodulator 304.

It should be understood that the function of demodulator 304 is very similar to that of receivers 44 and 48 of the preferred embodiment, wherein the data received from modulator 302 is extracted from the first and second "equalized" modulated signals in accordance with the "frequency split scheme" and "frequency foldback scheme" of the present invention. As such, the signal out of demodulator 304 should be the same as the signal into modulator 302.

Finally, although radio system 300 has been described and illustrated hereinabove as a simplex (i.e. one-way) system, it should be apparent to one skilled in the art that the system could easily be adapted to a duplex (i.e. two-way) system, simply by replicating all of the various components in the opposite direction.

While the present invention has been described and illustrated hereinabove with regard to the preferred and alternative embodiments, it should be understood that various design modifications could be made to these embodiments without departing from the scope of the present invention. Therefore, the present invention is not to be limited to these specific embodiments, except insofar as such limitations are included in the following claims.

What We claim is:

1. A communication system, comprising:
    (a) a first communication device;
    (b) a second communication device located a distance from said first communication device; and
    (c) two or more separate communication paths connecting said first and second communication devices for the transmission of information therebetween;
    (d) wherein said first communication device is adapted to divide said information into two or more signals for transmission over a different one of said communication paths, wherein said information is assigned to a plurality of subcarriers on each one of said communication paths in such a manner as to enable said distance between said first and second communication devices to be extended, and wherein said second communication device is adapted to receive said signals from said communication paths and extract said information from said subcarriers on each of said communication paths.

2. The communication system of claim 1, wherein said first and second communication devices are adapted to increase the power level of each of said signals transmitted over said communication paths to thereby enable said distance between said first and second communication devices to be extended.

3. The communication system of claim 1, wherein said first and second communication devices are adapted to assign said information to a plurality of lower frequency subcarriers on each of said communication paths to thereby enable a greater amount of said information to be transmitted between said first and second communication devices.

4. The communication system of claim 3, wherein the transmission of said signals between said first and second communication devices is performed in accordance with an analog modulation scheme.

5. The communication system of claim 3, wherein the transmission of said signals between said first and second communication devices is performed in accordance with a discrete multi-tone modulation scheme.

6. The communication system of claim 1, wherein each of said communication paths comprises a metallic twisted wire pair.

7. The communication system of claim 1, wherein each of said communication paths comprises a coaxial cable.

8. The communication system of claim 1, wherein each of said communication paths comprises a single-mode fiber optic cable.

9. The communication system of claim 1, wherein each of said communication paths comprises a multi-mode fiber optic cable.

10. The communication system of claim 1, wherein each of said communication paths comprises an RF path.

11. The communication system of claim 10, wherein each RF path has a fixed frequency range.

12. The communication system of claim 10, wherein each RF path comprises a CDMA radio channel.

13. An assymetric digital subscriber line ("ADSL") transceiver system for transmitting information between a central office and a customer premise, comprising:
    (a) a central office ADSL transceiver unit ("ATU-C") located at said central office;
    (b) a remote ADSL transceiver unit ("ATU-R") located a distance from said central office at said customer premise; and
    (c) two or more metallic twisted wire pairs connecting said ATU-C and said ATU-R for the transmission of said information therebetween;
    (d) wherein said ATU-C and said ATU-R are each adapted to divide said information into two or more signals, each of which is transmitted over a different one of said metallic twisted wire pairs, and wherein said ATU-C and said ATU-R are also each adapted to receive said divided signals from said metallic twisted wire pairs and extract said information therefrom.

14. The ADSL transceiver system of claim 13, wherein said ATU-C and said ATU-R are each adapted to divide said information into said two or more signals in such a manner as to enable said distance between said ATU-C and said ATU-R to be extended.

15. The ADSL transceiver system of claim 13, wherein said ATU-C and said ATU-R are each adapted to divide said information into said two or more signals in such a manner as to enable a greater amount of said information to be transmitted between said ATU-C and said ATU-R.

16. The ADSL transceiver system of claim 13, wherein said ATU-C and said ATU-R are each adapted to use a discrete multi-tone ("DMT") modulation scheme whereby said information is carried in a plurality of DMT subcarriers within a specified frequency range over said metallic twisted wire pairs.

17. The ADSL transceiver system of claim 16, wherein said DMT subcarriers are utilized to carry said information over said metallic twisted wire pairs such that the power level of said signals can be increased to thereby enable said distance between said ATU-C and said ATU-R to be extended.

18. The ADSL transceiver system of claim 17, wherein said DMT subcarriers utilized to carry said information over said metallic twisted wire pairs comprise the DMT subcarriers located in a lower portion of said specified frequency range of each of said metallic twisted wire pairs to thereby enable a greater amount of said information to be transmitted between said ATU-C and said ATU-R.

19. The ADSL transceiver system of claim 16, wherein said DMT subcarriers are utilized to carry said information over said metallic twisted wire pairs to thereby enable a greater amount of said information to be transmitted between said ATU-C and said ATU-R.

20. A communication system for transmitting information between a first location and a second location, comprising:
(a) first communication means located at said first location for dividing said information into two or more signals for transmission to said second location;
(b) second communication means located a distance from said first communication means at said second location for receiving said signals and extracting said information therefrom; and
(c) two or more communication paths connecting said first and second communication means such that each of said signals is transmitted over a different one of said communication paths, wherein said specified wherein said information is assigned to a plurality of subcarriers on each of said communication paths in such a manner as to enable said distance between said first and second communication devices to be extended.

21. The communication system of claim 20, wherein said first and second communication means increase the power level of said signals transmitted over said communication paths to thereby enable said distance between said first and second communication means to be extended.

22. The communication system of claim 20, wherein said first and second communication means are each adapted to assign said information to a plurality of lower frequency subcarriers on each of said communication paths to thereby enable a greater amount of said information to be transmitted between said first and second locations.

23. A method for transmitting information between a first communication device and a second communication device located a distance apart over two or more separate communication paths, comprising the steps of:
(a) dividing said information into two or more signals for transmission over a different one of said communication paths by assigning said information to a plurality of subcarriers on each of said communication paths in such a manner as to allow the power level of said signals to be increased to thereby enable said distance between said first and second communication devices to be extended;
(b) transmitting each of said signals over said communication paths;
(c) receiving said signals from said communication paths; and
(d) extracting said information from said subcarriers on each of said communication paths.

24. The method of claim 23, wherein said information is divided into said two or more signals in accordance with an analog modulation scheme.

25. The method of claim 24, wherein said information is assigned to a plurality of lower frequency subcarriers on each of said communication paths to thereby enable a greater amount of said information to be transmitted between said first and second communication devices.

26. A method for transmitting information between a central office ADSL transceiver unit ("ATU-C") and a remote ADSL transceiver unit ("ATU-R") located a distance apart over two or more metallic twisted wire pairs, comprising the steps of:
(a) dividing said information into two or more signals for transmission over a different one of said metallic twisted wire pairs by assigning said information to a plurality of subcarriers on each of said twisted wire pairs;
(b) transmitting each of said signals over said metallic twisted wire pairs;
(c) receiving said signals from said metallic twisted wire pairs; and
(d) extracting said information from said subcarriers on each of said metallic twisted wire pairs.

27. The method of claim 26, wherein said information is divided into said two or more signals in such a manner as to enable said distance between said ATU-C and said ATU-R to be extended.

28. The method of claim 26, wherein said information is divided into said two or more signals in such a manner as to enable a greater amount of said information to be transmitted between said ATU-C and said ATU-R.

29. The method of claim 26, wherein said information is divided into said two or more signals in accordance with a discrete multi-tone ("DMT") modulation scheme.

30. The method of claim 29, wherein said information is divided into said two or more signals by assigning said information to a plurality of DMT subcarriers in such a manner that the power level of said signals can be increased to thereby enable said distance between said ATU-C and said ATU-R to be extended.

31. The method of claim 30, wherein said information is assigned to a plurality of lower frequency DMT subcarriers to thereby enable a greater amount of said information to be transmitted between said ATU-C and said ATU-R.

32. The method of claim 29, wherein said information is divided into said two or more signals by assigning said information to a plurality of DMT subcarriers in such a manner as to enable a greater amount of said information to be transmitted between said ATU-C and said ATU-R.

* * * * *

UNITED STATES PATENT AND TRADEMARK OFFICE
CERTIFICATE OF CORRECTION

PATENT NO.   : 6,731,678 B1
DATED        : May 4, 2004
INVENTOR(S)  : Albert L. White et al.

It is certified that error appears in the above-identified patent and that said Letters Patent is hereby corrected as shown below:

Column 15,
Line 45, delete "one" between "each" and "of".

Column 17,
Line 18, delete ", wherein said specified" between "paths" and "wherein".

Signed and Sealed this

Nineteenth Day of October, 2004

JON W. DUDAS
*Director of the United States Patent and Trademark Office*